United States Patent
Noble et al.

(10) Patent No.: US 9,058,674 B1
(45) Date of Patent: Jun. 16, 2015

(54) ENHANCING RESOLUTION OF SINGLE IMAGES

(71) Applicant: Amazon Technologies, Inc., Reno, NV (US)

(72) Inventors: Isaac Scott Noble, Soquel, CA (US); Matthew Paul Bell, Sunol, CA (US)

(73) Assignee: AMAZON TECHNOLOGIES, INC., Reno, NV (US)

( * ) Notice: Subject to any disclaimer, the term of this patent is extended or adjusted under 35 U.S.C. 154(b) by 183 days.

(21) Appl. No.: 13/837,079

(22) Filed: Mar. 15, 2013

(51) Int. Cl.
*G06K 9/32* (2006.01)
*G06T 3/40* (2006.01)

(52) U.S. Cl.
CPC .................................. *G06T 3/4053* (2013.01)

(58) Field of Classification Search
USPC ......... 382/299, 218, 219, 254, 255, 276, 118; 345/592, 1.3, 628; 340/12.25, 5.61, 340/5.64; 250/221, 208.1; 455/411, 418, 455/420, 414.1, 426.1, 456.1, 456.3; 704/2, 704/9, 10, 257; 715/202, 205, 206, 208.1, 715/231
See application file for complete search history.

(56) References Cited

U.S. PATENT DOCUMENTS

| | | | | |
|---|---|---|---|---|
| 8,255,786 B1 * | 8/2012 | Gattani et al. | ................ | 715/205 |
| 8,315,849 B1 * | 11/2012 | Gattani et al. | .................... | 704/2 |
| 8,626,491 B2 * | 1/2014 | Gattani et al. | .................... | 704/9 |
| 8,799,756 B2 * | 8/2014 | Grosz et al. | ................... | 715/202 |
| 8,805,110 B2 * | 8/2014 | Rhoads et al. | ................ | 382/255 |

OTHER PUBLICATIONS

Glasner, Daniel et al., "Super-Resolution from a Single Image", Jul. 14, 2009, 8 pages.

* cited by examiner

*Primary Examiner* — Anh Do
(74) *Attorney, Agent, or Firm* — Novak Druce Connolly Bove + Quigg LLP (57) ABSTRACT

A computing device can capture an image using a camera of the device. The computing device can also determine or receive an image property (i.e., information related to the image). The device can transmit the image and the information related to the image to a network service. The network service can communicate with an image patch library which includes a plurality of image patches. The network service can select a subset of image patches from the library based on the information related to the image. The network service can compare image portions of the image to the image patches in the subset to determine one or more image patches that match one or more image portions. In some embodiments, the one or more image patches can have corresponding higher resolution versions. The network service can modify image portions of the image using available higher resolution versions of matching image patches.

24 Claims, 8 Drawing Sheets

ENHANCING RESOLUTION OF SINGLE IMAGES

BACKGROUND

Users are increasingly utilizing computing devices for various purposes. As an example, computing devices are frequently being used as digital cameras for capturing a wide variety of images. In one example, a user can utilize a camera of his computing device to capture an image of a scenery or landmark. In another example, the user can use the camera on his device to take photographs of food. In a further example, the user can use his computing device camera to take of a picture of a friend. However, due to size, resource, and other limitations of conventional computing devices, cameras natively included on computing device are typically lower in quality when compared to other designated cameras, such as digital cameras and single-lens reflex (SLR) cameras. Thus, cameras of computing devices typically produce images that are lower in quality when compared to those images produced by other designated cameras. The lower quality of images produced by computing device cameras can reduce the overall user experience associated with using computing devices.

BRIEF DESCRIPTION OF THE DRAWINGS

Various embodiments in accordance with the present disclosure will be described with reference to the drawings, in which.

DETAILED DESCRIPTION

Systems and methods in accordance with various embodiments of the present disclosure overcome one or more of the above-referenced and other deficiencies in conventional approaches to creating and/or processing images. In particular, various embodiments of the present disclosure can enhance (i.e., increase) the resolution or other quality of an image using, at least in part, one or more image properties or other information contained in, or related to, the image.

At least some embodiments enable a computing device to capture (i.e., acquire) an image, while other methods for obtaining an image can be used as well. In some embodiments, the computing device can also determine and/or obtain at least one image property or other information related to the image. For example, the computing device can use its geolocation sensor(s) to determine where the image was captured. In another example, the computing device can use its orientation sensor(s) to determine a direction at which a camera of the device is facing when the image is being captured by the camera of the device. The computing device can also utilize its system settings (e.g., system clock/clock) to determine a temporal property (e.g., time of day, date, season, etc.) of the image when captured. In a further example, the computing device can present a user interface configured to receive input from an entity, such as the user of the device. The input from the entity can specify a subject matter included in at least a portion of the image captured and/or a description of at least a portion of the image. The image property/information as well as the image can be transmitted by the computing device to a network service (i.e., networked image service, image service, etc.) to be enhanced.

In some embodiments, the network service can receive the image as well as the image property or information related to the image. Based, at least in part, on the information related to the image (i.e., image property), the network service can select a subset of image portions from an image portion library. These "library" image portions, also referred to herein as image patches, can be selected such that all the library image portions in the subset are associated with the information related to the image. For example, if the information related to the image is geolocation information specifying that the image was captured at the Grand Canyon, then the subset can be selected to include only library image portions that are associated with (e.g., captured at or near) the Grand Canyon. As such, the subset of library image portions can be more narrowed/limited, but also more relevant, thereby allowing for more efficient and accurate image portion searches.

In some embodiments, an image portion or patch can be a lower resolution image portion (i.e., "lo-res image patch") belonging to an image portion group that has a corresponding higher resolution image portion (i.e., "hi-res image patch"). The higher resolution image portion can, for example, be a higher resolution version of the lower resolution image portion. In some embodiments, the image portion groups can be image portion pairs, each pair comprising a lo-res patch and a hi-res patch.

The network service can perform a portion by portion analysis of the received image, also referred to herein as the "source" image. In other words, the network service can analyze the received (source) image by analyzing one source image portion at a time. In some embodiments, the network service can virtually divide the image into a plurality of source image portions. For each source image portion, the network service can search the subset of library image portions in attempt to find at least one library image portion that substantially matches or corresponds to a respective source image portion. If one or more library image portions matches the respective source image portion within an allowable threshold, then the service can modify the respective source image portion using the matching library image portion(s) and/or using a higher resolution version(s) of the matching library image portion(s). For example, the respective source image portion can be replaced by a hi-res library image portion corresponding to a lo-res library image portion that matches the respective source image portion. The network service can repeat this process of library image portion searching and source image portion modifying, in order to generate an enhanced version of the received image.

In some embodiments, the image portion library can include image portion groups (e.g., lo-res-hi-res pairs) that are generated from the image. In one example, the source image can be (virtually) divided into image source portions. The source image portions can be down-sampled to result in smaller-sized source image portions. For example, a 10 pixel by 10 pixel source image portion can be down-sampled, resized, or otherwise processed to produce a similar image but as a 5 pixel by 5 pixel source image portion. The down-sampled source image portion and the non-down-sampled source image portion can form an image patch group (e.g., a lo-res-hi-res pair) that can be transmitted to and be included in the image portion library. Thus, if the network service determines that a particular portion of the source image matches the down-sampled source image portion, the particular portion of the image can be enhanced by being replaced or merged with the non-down-sampled (higher resolution) source image portion.

Various other functions and advantages are described and suggested below as may be provided in accordance with the various embodiments.

Figure 1:
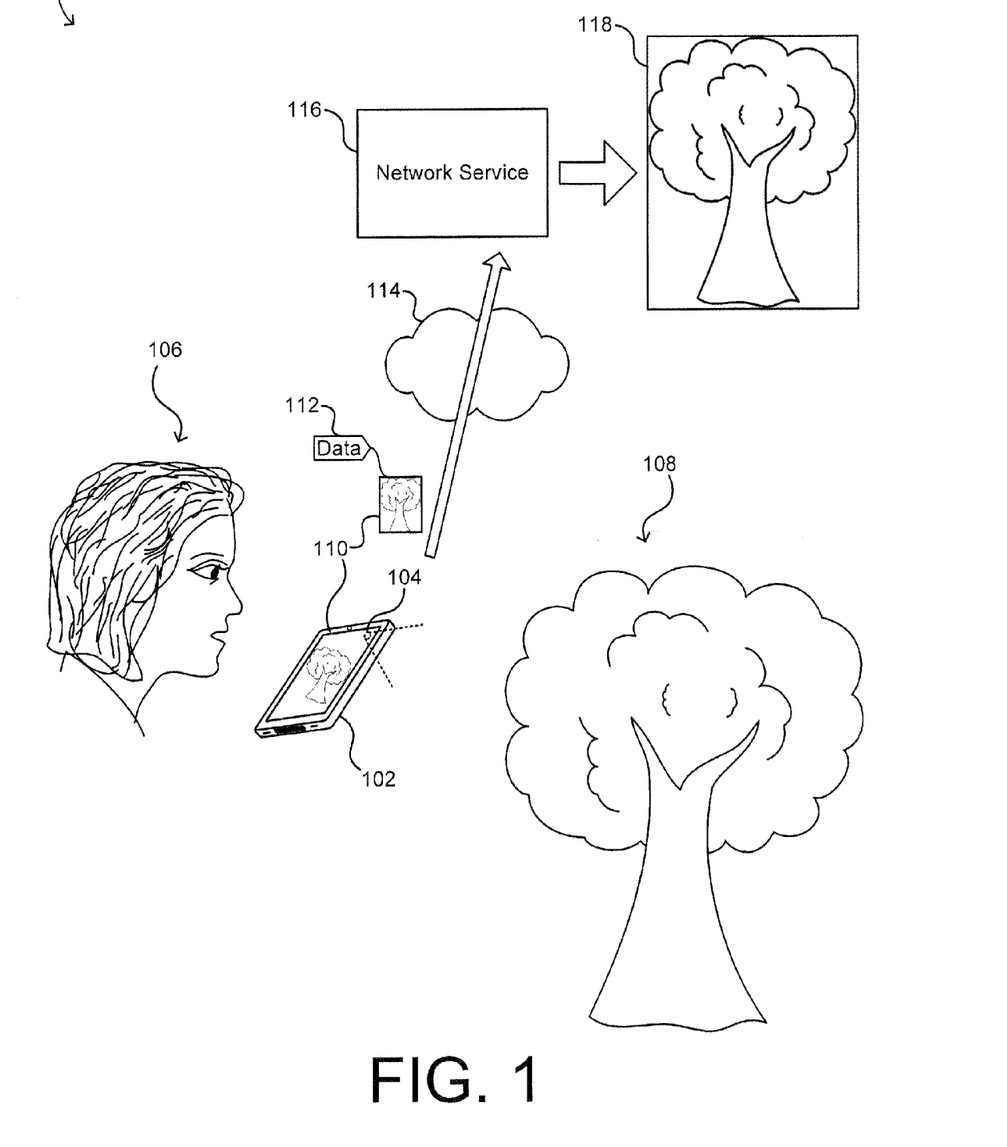
FIG. 1 illustrates an example environment in which aspects of the various embodiments can be utilized.

FIG. 1 illustrates an example environment in which aspects of the various embodiments can be utilized. In the example environment 100 of FIG. 1, there can be a computing device 102 and at least one camera 104 of the computing device 102. In some embodiments, the at least one camera 104 can be a back-facing camera, as shown in FIG. 1. A user 106 of the computing device 102 can use the at least one camera 104 to capture an image 110 of a scene or subject matter(s) of interest 108. The image 110 can be transmitted over a network 114 to a network service (e.g., networked image service) 116 for processing. The image 110 can be transmitted along with at least one image property 112 associated with the image (e.g., data tagged with the image, information related to the image, etc.).

In some embodiments, the at least one image property 112 can include geolocation information indicating where the image 110 was captured. For example, the computing device 102 can comprise one or more geolocation sensors (e.g., Global Positioning System (GPS) chip, radio signal multilateration system, cellular triangulation sensor, etc.) configured to determine a geolocation of the computing device. The one or more geolocation sensors can determine the geolocation of the computing device 102 at substantially the time (e.g., within an allowable time period) when the image 110 was captured by the camera 104 of the computing device 102.

In some embodiments, the at least one image property 112 can include data inputted by an entity, such as the user 106, that indicates a subject matter included in the image 110. For example, the user 102 can specify a subject matter (e.g., nature, giant sequoia, etc.) for the entire image 110. In another example, the user 102 can specify a subject matter for a portion(s) of the image 110 (e.g., branch, leaves, etc.). In a further example, if (a face of) an entity (e.g. person) is included in the image 110, then an identifier (e.g., "Joe Smith", "Jane Smith", etc.) for (the face of) the entity in the image 110 can be included as the image property 112.

It is further contemplated that a person of ordinary skill in art would recognize various other information that can be included with and/or indicated by the at least one image property 112. For example, the at least one image property 112 can also indicate a direction in which the camera 104 of the device 102 was pointing at substantially the time when the image 110 was captured. In some embodiments, the direction can be determined using, at least in part, one or more orientation sensors (e.g., gyroscope, accelerometer, compass, etc.) of the device 102 and/or one or more geolocation sensors of the device 102. In another example, the at least one image property 112 can indicate a temporal aspect related to the image 110. The temporal aspect can include a time of day, a day of the week, a calendar date, a season of the year, etc., determined using, for example. a system clock/calendar of the device 102.

As shown in FIG. 1, the image 110 and the at least one image property 112 (i.e., data related to the image 110) can be transmitted from the computing device 102 over the network 114 (e.g., Internet, intranet, LAN, WLAN, etc.) to the network service 116. The network service 116 can provide network infrastructure and resources for running various applications and/or other computing operations. In some embodiments, the network service 116 can be configured to process the image 110 and the at least one image property 112 received over the network 114. The network service 116 can utilize the received image 110 and the at least one image property 112 to generate an enhanced version 118 of the image 110.

In some embodiments, the network service 116 can provide the user 106 (e.g., via the user's computing device 102) with access to the enhanced image version 118. For example, the network service 116 can transmit the enhanced image 118 back to the user 106 and/or device 102. In another example, the network service 116 can provide a link to the user 106/device 102 for accessing the enhance image 118.

Figure 2:
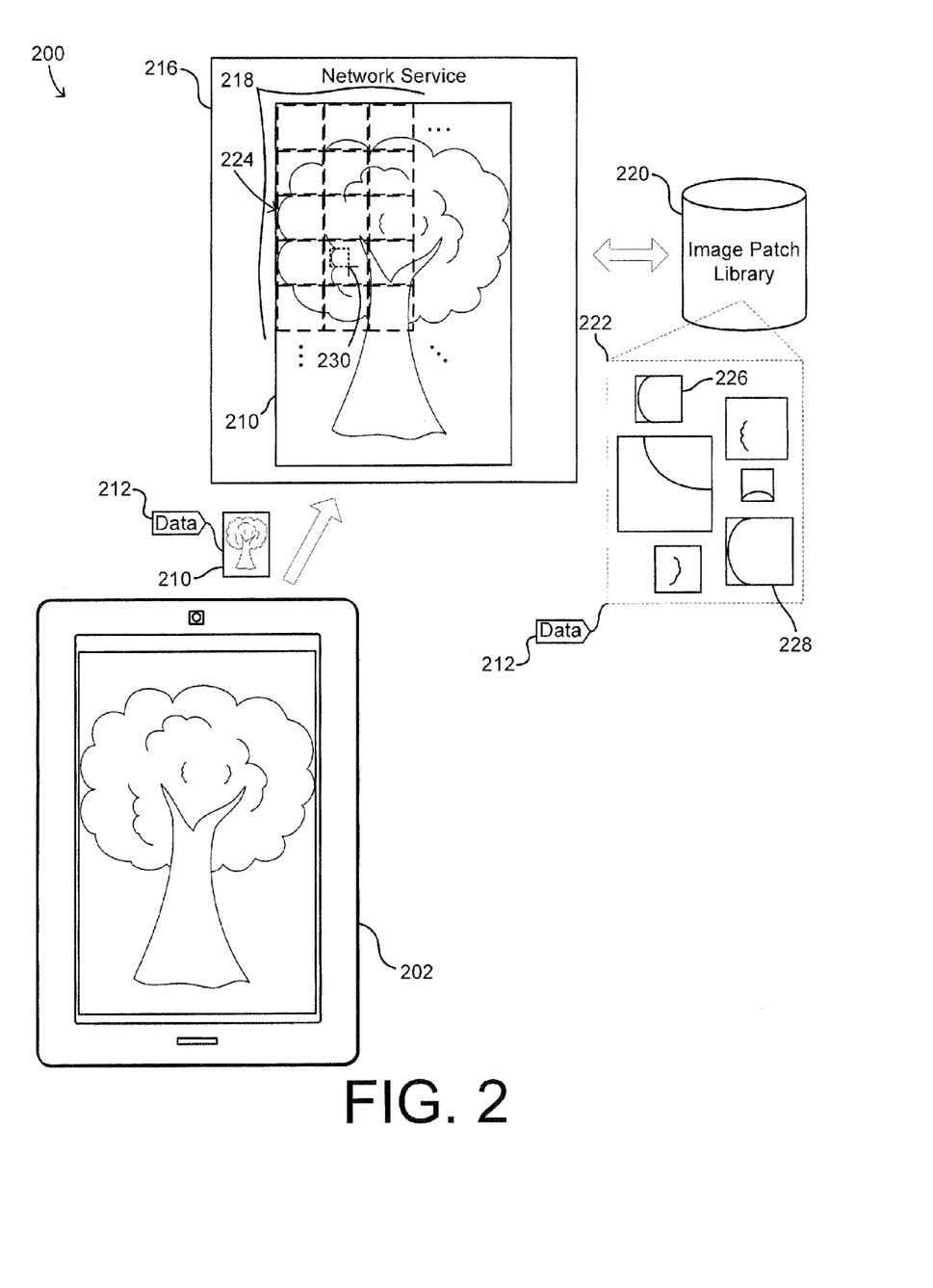
FIG. 2 illustrates an example system embodiment for image enhancement at a network service using an image property.

FIG. 2 illustrates an example system embodiment 200 for image enhancement at a network service using an image property. The example system embodiment 200 can comprise a computing device 202, a network service 216, and an image patch library 222. The computing device 102 can capture an image 210 and transmit the image 210 to the network service 216. Along with the image 210, there can be information 212 related to the image (e.g., data tagged with the image, an image property, etc.). The information 212 related to the image 210 can be obtained and/or generated via the computing device 202. As mentioned above, the information 212 related to the image 210 can include (but is not limited to) geolocation information at substantially where the image was captured, a direction at which the camera of the device was pointing while capturing the image, a time of day/year when the image was captured, data inputted by an entity (e.g., the user of the device 202) to provide one or more details about the image, and/or other information related to the image 210.

The network service 216 can receive the image 210 and the related information 212. The network service 216 can then process the image 210 using, at least in part, the related information 212 in attempt to generate an enhanced version of the image 210. In some embodiments, the network service 216 can virtually divide the received image into one or more image portions 218 (i.e., image patches, patches). For example, the network service 216 can select an image portion size (e.g., 5×5 pixels, 10×10 pixels, etc.) and analyze the image with respect to a plurality of image portions 218 at the selected size (e.g., 5×5 pixel portions, 10×10 pixel portions, etc.). In other words, the network service 216 can virtually divide the image (without modifying the image) into a plurality of image portions 218 at a selected size(s). In some embodiments, the network service 216 can then create a copy of each image portion 218 and process each copy of the image portion such that the original image 210 does not get unintentionally modified.

Continuing with FIG. 2, the network service 216 can communicate with an image patch library 220. The image patch library 220 can be an electronic storage unit configured to store a plurality of image patches (i.e., image portions). In some embodiments, the image patch library 220 can reside with the network service 216. In some embodiments, the image patch library 220 can reside at one or more servers external to the network service 216.

Moreover, in some embodiments, each image patch can be part of a respective image patch group. For example, each image patch group can include two image patches, a lower resolution image patch and a higher resolution image patch. As such, the image patch group in this example can be an image patch pair comprising a "lo-res" patch and a "hi-res" patch (i.e., "lo-res-hi-res pair").

The network service 216 can communicate with the image patch library 220 to perform image patch matching. In some embodiments, image patch/portion matching can include comparing one or more pixels of a first image portion (e.g., source image portion) to one or more pixels of a second image portion (e.g., library image portion). For example, the comparing of the pixels of the first and second image portions can check for similarity in at least one image aspect (e.g., pixel color, pixel hue, pixel brightness, etc.). Continuing with the example, a set of pixels of the first image portion can substantially match or correspond to a set of pixels of the second image portion if the two sets are sufficiently similar (e.g., within an allowable deviation) with respect to one or more pixel aspects (e.g., pixel color, pixel hue, pixel brightness, etc.). In some embodiments, image patch matching can be performed utilizing, at least in part, line detection, edge detection, feature detection, image color comparison, image texture comparison, image shape comparison, image distance measurement, and/or other image processing techniques.

For each of the image portions 218 for the image 210, the network service 216 can search for one or more lo-res image patches that substantially matches (i.e., matches within an allowable threshold) a respective image portion. If a (substantially) matching lo-res image patch is found for a respective image portion, the respective image portion can be modified using a hi-res image patch that corresponds to the matching lo-res patch (i.e., the hi-res patch that is in the same patch group/pair as the lo-res patch). In some embodiments, the respective image portion can be modified using (e.g., replaced by, merged with, etc.) the hi-res image patch corresponding to the lo-res patch that matches the respective image portion. In one example, merging can include comparing a set of pixels in the hi-res image patch with a corresponding set of pixels in respective image portion and determining middle (e.g., median, mean, somewhere in between, etc.) values (e.g., pixel color values) between the pixels in the hi-res image patch and the corresponding pixels in the respective image portion. In another example, merging can include combining an area of the hi-res image patch with a related (e.g., adjacent, nearby, etc.) area of the respective image portion which has no corresponding hi-res matching patch.

Various embodiments of the present disclosure can enable the network service 216 to take into consideration the information/data 212 related to the image 210 and select a subset 222 of image patches in the library 220 such that the subset 222 comprises image patches that are associated with the information/data 212. In one example, if the information/data 212 indicates that the image 210 was captured at the Grand Canyon, then the subset 222 can be selected to include only those image patches that are associated with the Grand Canyon (e.g., only image patches that are part of images that were captured at the Grand Canyon). As such, the utilization of the information/data 212 related to the image 210 to select the subset 222 can significantly improve the quality, accuracy, as well as speed of image patch matching because the subset 222 can be chosen to be more narrowed/limited, but also more relevant.

In one example, the network service 216 can perform patch matching for a particular image portion (224) of the image 210. The network service 216 can communicate with the image patch library 220 to select the relevant subset 222 of image patches based on the information/data 212 related to the image 210. In this example, the information/data 212 can indicate that the image 210 (and/or image portion 224) was captured at Redwood National Park. Accordingly, the subset 222 can be selected to include image patches that are associated with Redwood National Park. The subset 222 can be searched in attempt to identify one or more image patches that substantially match the particular image portion 224.

Continuing with the example, the service 216 can determine that image patch 226, from the subset 222, substantially matches image portion 224 of the image 210. If image patch 226 is of a better image quality than image portion 224, then patch 226 can be used to modify (e.g., replace, merge with, etc.) image portion 224. In some embodiments, if image patch 226 is associated with a higher resolution version (e.g., if image patch 226 is in an image patch group/pair that contains a hi-res patch that corresponds to image patch 226), then the higher resolution version image patch can be used to modify (e.g., replace, merge with, etc.) image portion 224. In this example, patch 228 can be a higher resolution version of patch 226. Although not illustrated in FIG. 2, patch 226 and patch 228 can be included the same image patch group (and thereby forming a lo-res-hi-res pair).

In some embodiments, the network service 216 can attempt to determine matching patches for smaller image portions first and then progress to larger image portions. In an example, the service 216 can first select the size of image portions for the image 210 to be smaller (e.g., 5×5 pixels), perform patch matching for the smaller image portions, select a larger image portion size (e.g., 10×10 pixels), then perform another patch matching for the larger image portions, and so forth.

Furthermore, in some embodiments, the image patch library 220 can include image patches that are generated from the image 210. For example, the network service 216 can downscale (i.e., down-sample) the received 210 and (virtually) divide the downscaled version of the image into image portions. The image portions of the downscaled image can be compared to image portions of the (non-downscaled) image 210. In another example, upon (virtually) dividing the image 210 into image portions 218, the network service 216 can downscale (at least some of) the image portions and perform a search with respect to (at least some of) the non-downscaled image portions 218 to determine any matches. With reference to FIG. 2, a downscaled version of image portion 224 can match image portion 230. Image portion 230 and image portion 224 can thus form a lo-res-hi-res pair. (Copies of) The lo-res-hi-res pair of image portion 230 and image portion 224 can be stored in the image patch library 220. Moreover, image portion 230 can be modified (e.g., replaced by, merged with, etc.) using image portion 224 such that an image quality (e.g., resolution, sharpness) of image portion 230 can be improved.

A person of ordinary skill in the art would recognize that there can be various techniques and/or algorithms for image patch matching that can be implemented with the various embodiments of the present disclosure.

Figure 3:
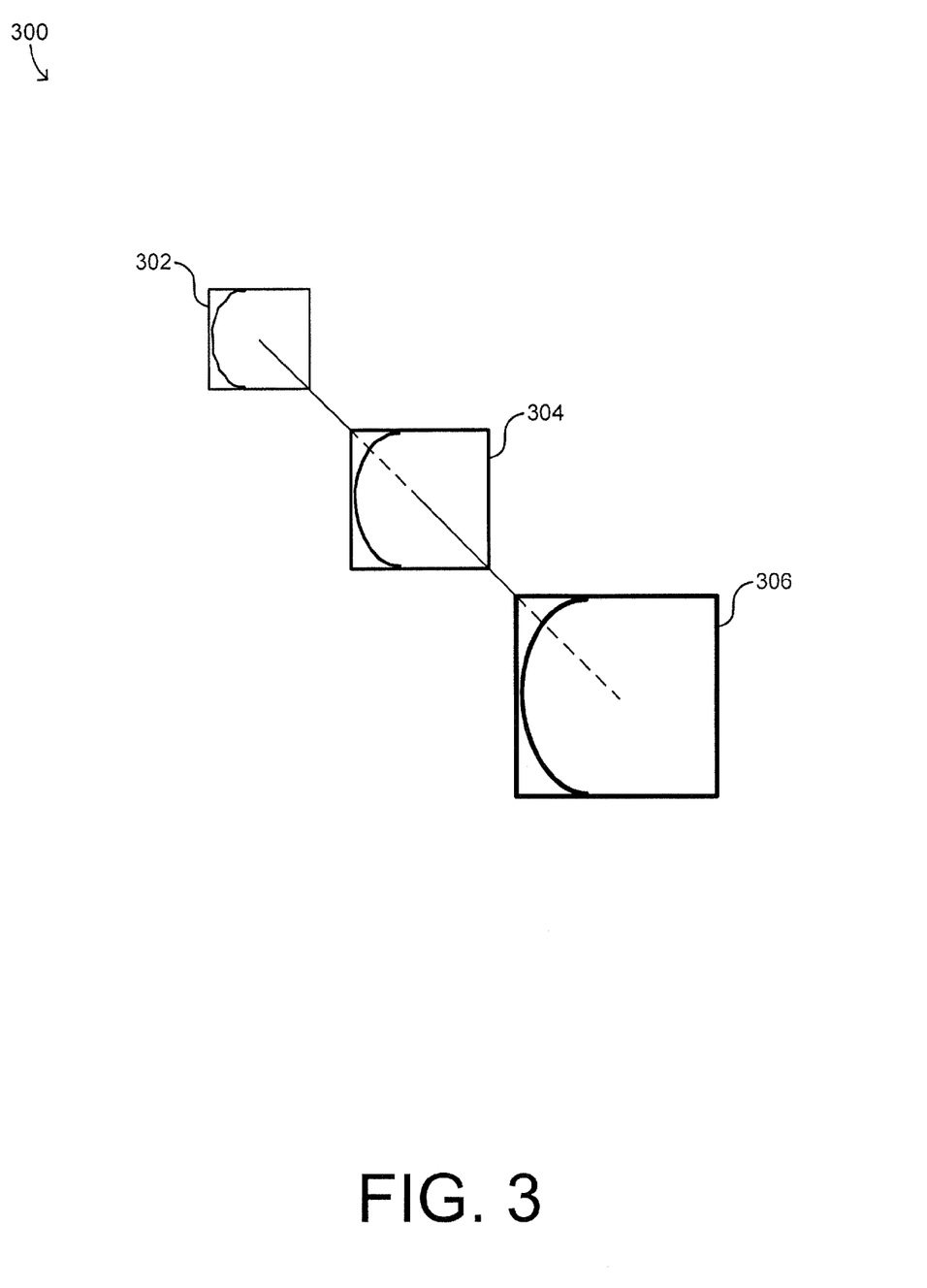
FIG. 3 illustrates an example group of patches useful for image enhancement at a network service using an image property.

With reference now to FIG. 3, an example group 300 of image patches useful for image enhancement at a network service using an image property is shown. In some embodiments, the example image patch group 300 can be an image patch pair comprising a lower resolution image patch and a higher resolution image patch (i.e., lo-res-hi-res pair). In some embodiments, such as in FIG. 3, the example image patch group 300 can include more than two image patches (e.g., 302, 304, 306). Each of the image patches within an image patch group can (substantially) match one another. As shown in FIG. 3, each of the image patches (e.g., 302, 304, 306) can have captured the same (or substantially similar) subject matter.

Referring now to FIG. 2 and FIG. 3, if the image patch group 300 is associated with the information/data 212 related to the image 210 received at the network service 216, then the image patch group 300 can be included in the subset 222 selected by the network service 216 from the image patch library 220. In the example of FIG. 3, the image patch group 300 can comprise patches (e.g., 302, 304, 306) that are associated with the information related to the image received at the network service. For example, if the information 212 indicates that the image 210 was captured at Redwood National Park, the patches (e.g., 302, 304, 306) can be associated with Redwood National Park; in other words, the patches (e.g., 302, 304, 306) can be images and/or portions of images that were captured at Redwood National Park. Further, as shown in FIG. 2 and FIG. 3, the image patch group 300 can comprise patches (e.g., 302, 304, 306) that match the image portions 224 and 230 of the received image 210.

In one example, when the network service 216 searches the subset 222 for image patches that match the image portion 224, the service 216 can determine that image patch 302 matches the image portion 224. Accordingly, in order to enhance the image 210, the network service can, at least in part, modify the image portion 224 using image patch 302 and/or the higher resolution version(s) (e.g., 304, 306) of image patch 302. For example, the image portion 224 can be replaced by, merged with, or otherwise modified using image patch 302 if image patch 302 has a better image quality (e.g., resolution, sharpness, brightness, color, etc.) than image portion 224. In another example, image portion 224 can be replaced by, merged with, or otherwise modified using image patch 304 and/or image patch 306 if these patches have better image qualities than image portion 224.

In some embodiments, the matching of image patches to image portions can be processed in an increasing order of image patch resolutions. For example, lower resolution image patches (e.g., 302) can be searched for first to identify patches that match a given image portion (e.g., 224). Continuing with the example, subsequently, higher resolution image patches (e.g., 304) can be analyze to determine whether or not they match the given image portion. Further, even higher resolution patches (e.g., 306) can be compared with the given image portion to check for matching. The network service can select the highest resolution image patch that still matches the given image portion within an allowable threshold. The selected highest resolution image patch that still matches the given image portion can be used to modify and enhance the given image portion.

Figure 4:
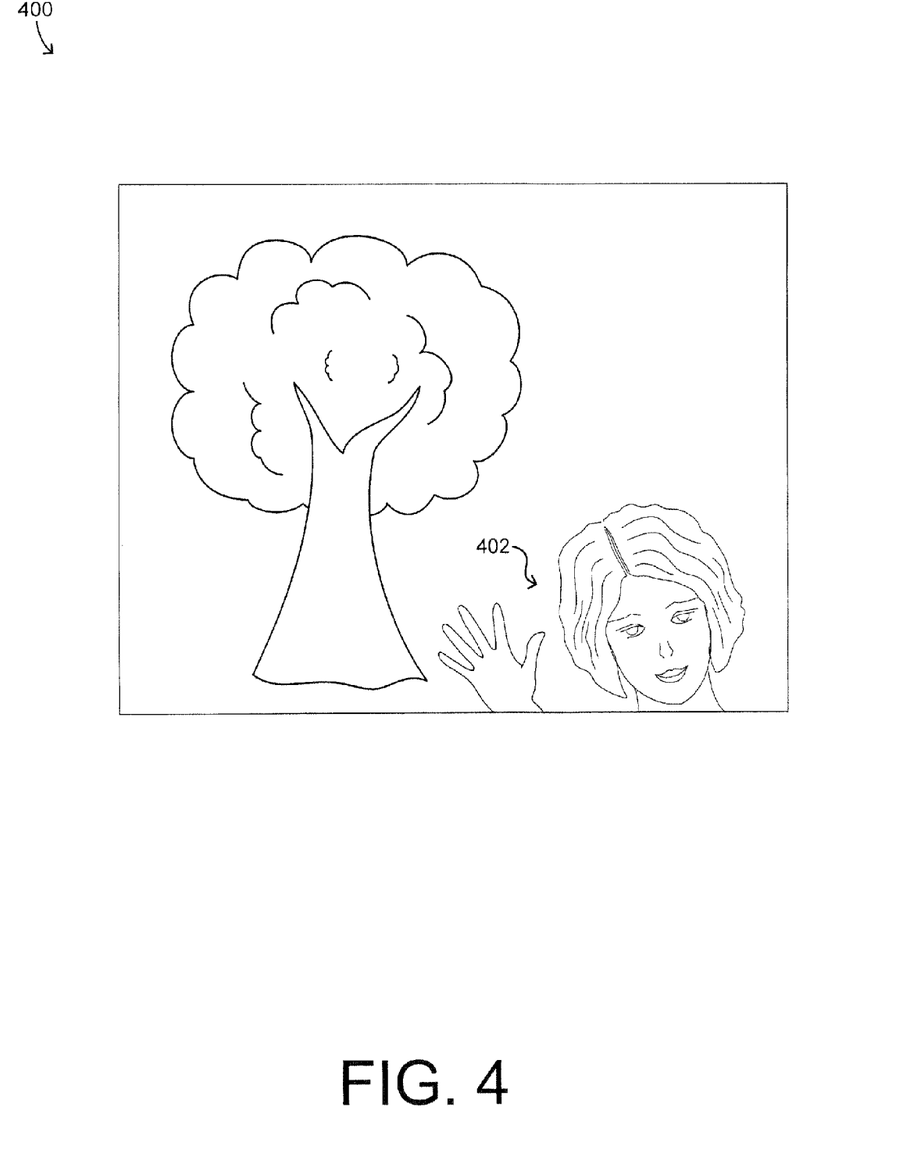
FIG. 4 illustrates an example image for which a network service can enhance using an image property.

FIG. 4 illustrates an example image 400 for which a network service can enhance using an image property. FIG. 4 shows that the example image 400 can include subject matter in the form of a face(s) 402 of an entity(ies) (e.g., person(s)). Various embodiments of the present disclosure can enable facial recognition. Facial recognition can facilitate the enhancement of the overall image, for example, by enabling the enhancement of an image quality(s) of the portion of the image that corresponds to the entity's face 402.

In some embodiments, facial recognition software and/or algorithms can be utilized to identify the face 402 of the entity (e.g., person). Having identified the face 402, a subset of image patches that are associated with the identified face 402 can be selected from the image patch library. The image patches that are associated with the identified face 402 can be, for example, images or portions of images captured of the same entity's face 402. These image patches can have a better image quality (e.g., higher resolution, sharper, more color-intense) than the portion(s) in the example image 400 that corresponds to the face 402.

In some embodiments, the image patches that are associated with the identified face 402 can be retrieved from the computing device used to capture the example image 400. For example, the face 402 in the example image 400 can belong to a friend of the person/user who took the picture 400. As such, an image library of the computing device may contain other pictures of the friend's face 402 that are of a better image quality(ies) (e.g., higher resolution) that in the image 400.

In some embodiments, the image patches that are associated with the identified face 402 can be retrieved from one or more servers external to the network service. In one example, the one or more servers can correspond to a social networking service, which can store other (better) images of the face 402. In another example, the one or more servers can correspond to an online image storing service, which can also store other (better) images of the face 402. Moreover, in some embodiments, an entity, such as the entity to whom the face 402 belongs, can upload higher quality (e.g., higher resolution) images of his/her/its face. In some embodiments, these high quality images can be captured at various perspectives, resulting in images of the face at different angles. In some embodiments, these high quality images can also contain different expressions of the face.

Figure 5:
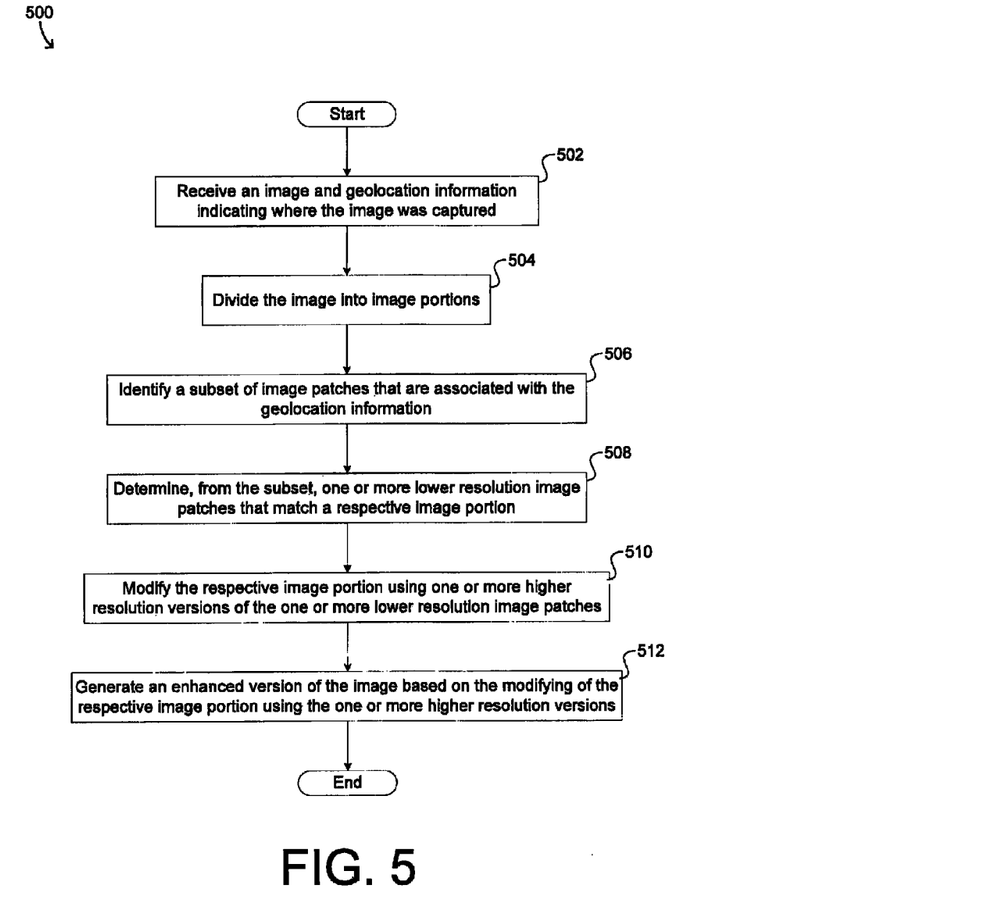
FIG. 5 illustrates an example method embodiment for image enhancement at a network service using an image property.

FIG. 5 illustrates an example method embodiment 500 for depth determination using camera focus. It should be understood that there can be additional, fewer, or alternative steps performed in similar or alternative orders, or in parallel, within the scope of the various embodiments unless otherwise stated. In some embodiments, the example method embodiment 500 can start with receiving an image and geolocation information indicating where the image was captured, at step 502. The image and geolocation information can be received at a network service. At step 504, the example method 500 can virtually divide the image into a plurality of image portions.

For each image portion in the plurality of image portions, the method 500 can identify a subset of image patches that are associated with the geolocation information, at step 506. The subset can be identified from a library including a plurality of image patches. Also, for each image portion in the plurality of image portions, the method 500 can determine, from the subset, one or more lower resolution image patches that match a respective image portion within an allowable threshold, at step 508. Each of the one or more lower resolution image patches can belong to an image patch group that further includes one or more higher resolution versions of a respective lower resolution image patch. Step 510 can include modifying the respective image portion using the one or more higher resolution versions. Step 512 can include generating an enhanced version of the image. The generating of the enhanced version can be based, at least in part, on the modifying of the respective image portion using the one or more higher resolution versions.

Figure 6:
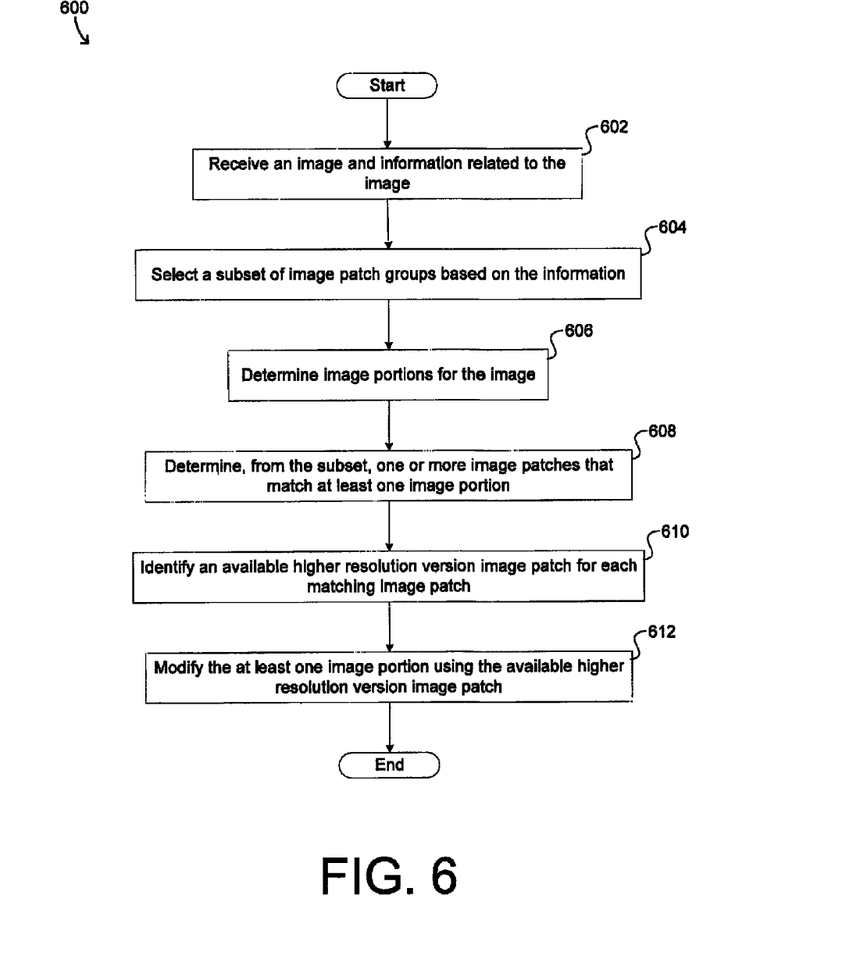
FIG. 6 illustrates an example method embodiment for image enhancement at a network service using an image property.

FIG. 6 illustrates an example method embodiment 600 for depth determination using camera focus. Again, it should be understood that there can be additional, fewer, or alternative steps performed in similar or alternative orders, or in parallel, within the scope of the various embodiments unless otherwise stated. At step 602, the example method embodiment 600 can receive an image and information related to the image. At step 604, the method 600 can selecting a subset of image patch groups based, at least in part, on the information. The subset can be selected from a plurality of image patch groups residing at an image patch library.

Step 606 can include determining a plurality of image portions for the image. Then at step 608, the method 600 can determine, from the subset of image patch groups, one or more image patches that match at least one image portion within an allowable threshold. Step 610 can include identifying an available higher resolution version image patch for each of the one or more image patches that match the at least one image portion. Then the method 600 can modify the at least one image portion using, at least in part, the available higher resolution version image patch, at step 612.

Figure 7:
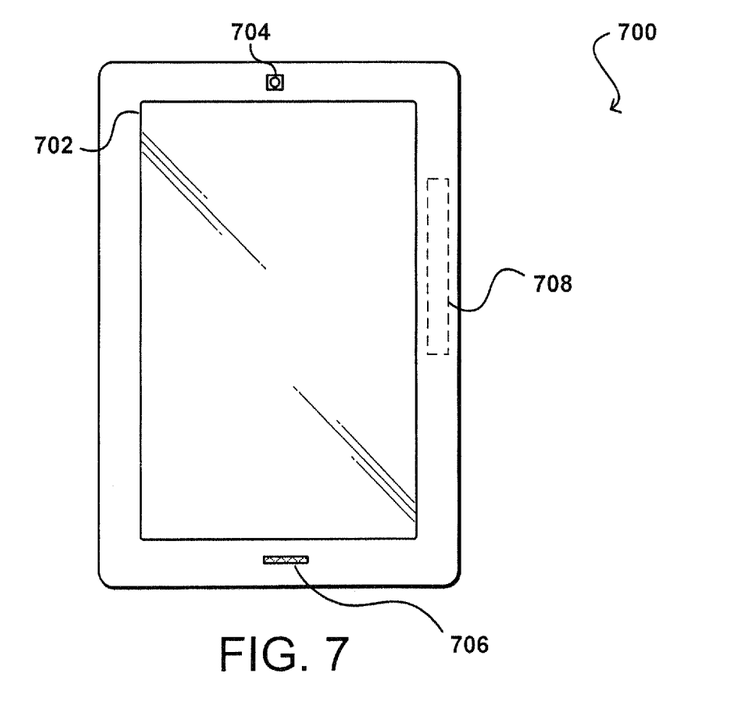
FIG. 7 illustrates an example device that can be used to implement aspects of the various embodiments.

FIG. 7 illustrates an example electronic user device 700 that can be used in accordance with various embodiments. Although a portable computing device (e.g., an electronic book reader or tablet computer) is shown, it should be understood that any electronic device capable of receiving, determining, and/or processing input can be used in accordance with various embodiments discussed herein, where the devices can include, for example, desktop computers, notebook computers, personal data assistants, smart phones, video gaming consoles, television set top boxes, and portable media players. In some embodiments, a computing device can be an analog device, such as a device that can perform signal processing using operational amplifiers. In this example, the computing device 700 has a display screen 702 on the front side, which under normal operation will display information to a user facing the display screen (e.g., on the same side of the computing device as the display screen). The computing device in this example includes at least one camera 704 or other imaging element for capturing still or video image information over at least a field of view of the at least one camera. In some embodiments, the computing device might only contain one imaging element, and in other embodiments the computing device might contain several imaging elements. Each image capture element may be, for example, a camera, a charge-coupled device (CCD), a motion detection sensor, or an infrared sensor, among many other possibilities. If there are multiple image capture elements on the computing device, the image capture elements may be of different types. In some embodiments, at least one imaging element can include at least one wide-angle optical element, such as a fish eye lens, that enables the camera to capture images over a wide range of angles, such as 180 degrees or more. Further, each image capture element can comprise a digital still camera, configured to capture subsequent frames in rapid succession, or a video camera able to capture streaming video.

The example computing device 700 also includes at least one microphone 706 or other audio capture device capable of capturing audio data, such as words or commands spoken by a user of the device. In this example, a microphone 706 is placed on the same side of the device as the display screen 702, such that the microphone will typically be better able to capture words spoken by a user of the device. In at least some embodiments, a microphone can be a directional microphone that captures sound information from substantially directly in front of the microphone, and picks up only a limited amount of sound from other directions. It should be understood that a microphone might be located on any appropriate surface of any region, face, or edge of the device in different embodiments, and that multiple microphones can be used for audio recording and filtering purposes, etc.

The example computing device 700 also includes at least one orientation sensor 708, such as a position and/or movement-determining element. Such a sensor can include, for example, an accelerometer or gyroscope operable to detect an orientation and/or change in orientation of the computing device, as well as small movements of the device. An orientation sensor also can include an electronic or digital compass, which can indicate a direction (e.g., north or south) in which the device is determined to be pointing (e.g., with respect to a primary axis or other such aspect). An orientation sensor also can include or comprise a global positioning system (GPS) or similar positioning element operable to determine relative coordinates for a position of the computing device, as well as information about relatively large movements of the device. Various embodiments can include one or more such elements in any appropriate combination. As should be understood, the algorithms or mechanisms used for determining relative position, orientation, and/or movement can depend at least in part upon the selection of elements available to the device.

Figure 8:
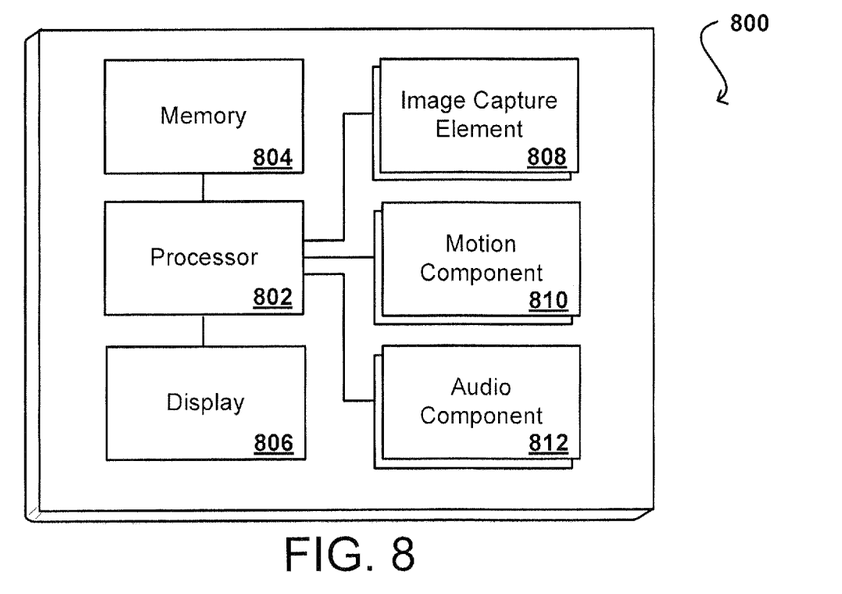
FIG. 8 illustrates example components of a client device such as that illustrated in FIG. 7.

FIG. 8 illustrates a logical arrangement of a set of general components of an example computing device 800 such as the device 700 described with respect to FIG. 7. In this example, the device includes a processor 802 for executing instructions that can be stored in a memory device or element 804. As would be apparent to one of ordinary skill in the art, the device can include many types of memory, data storage, or non-transitory computer-readable storage media, such as a first data storage for program instructions for execution by the processor 802, a separate storage for images or data, a removable memory for sharing information with other devices, etc. The device typically will include some type of display element 806, such as a touch screen or liquid crystal display (LCD), although devices such as portable media players might convey information via other means, such as through audio speakers. As discussed, the device in many embodiments will include at least one image capture element 808 such as a camera or infrared sensor that is able to image projected images or other objects in the vicinity of the device. Methods for capturing images or video using a camera element with a computing device are well known in the art and will not be discussed herein in detail. It should be understood that image capture can be performed using a single image, multiple images, periodic imaging, continuous image capturing, image streaming, etc. Further, a device can include the ability to start and/or stop image capture, such as when receiving a command from a user, application, or other device. The example device similarly includes at least one audio capture component 812, such as a mono or stereo microphone or microphone array, operable to capture audio information from at least one primary direction. A microphone can be a uni- or omni-directional microphone as known for such devices.

In some embodiments, the computing device 800 of FIG. 8 can include one or more communication elements (not shown), such as a Wi-Fi, Bluetooth, RF, wired, or wireless communication system. The device in many embodiments can communicate with a network, such as the Internet, and may be able to communicate with other such devices. In some embodiments the device can include at least one additional input device able to receive conventional input from a user. This conventional input can include, for example, a push button, touch pad, touch screen, wheel, joystick, keyboard, mouse, keypad, or any other such device or element whereby a user can input a command to the device. In some embodiments, however, such a device might not include any buttons at all, and might be controlled only through a combination of visual and audio commands, such that a user can control the device without having to be in contact with the device.

The device 800 also can include at least one orientation or motion sensor 810. As discussed, such a sensor can include an accelerometer or gyroscope operable to detect an orientation and/or change in orientation, or an electronic or digital compass, which can indicate a direction in which the device is determined to be facing. The mechanism(s) also (or alternatively) can include or comprise a global positioning system (GPS) or similar positioning element operable to determine relative coordinates for a position of the computing device, as well as information about relatively large movements of the device. The device can include other elements as well, such as may enable location determinations through triangulation or another such approach. These mechanisms can communicate with the processor 802, whereby the device can perform any of a number of actions described or suggested herein.

As an example, a computing device such as that described with respect to FIG. 7 can capture and/or track various information for a user over time. This information can include any appropriate information, such as location, actions (e.g., sending a message or creating a document), user behavior (e.g., how often a user performs a task, the amount of time a user spends on a task, the ways in which a user navigates through an interface, etc.), user preferences (e.g., how a user likes to receive information), open applications, submitted requests, received calls, and the like. As discussed above, the information can be stored in such a way that the information is linked or otherwise associated whereby a user can access the information using any appropriate dimension or group of dimensions.

Figure 9:
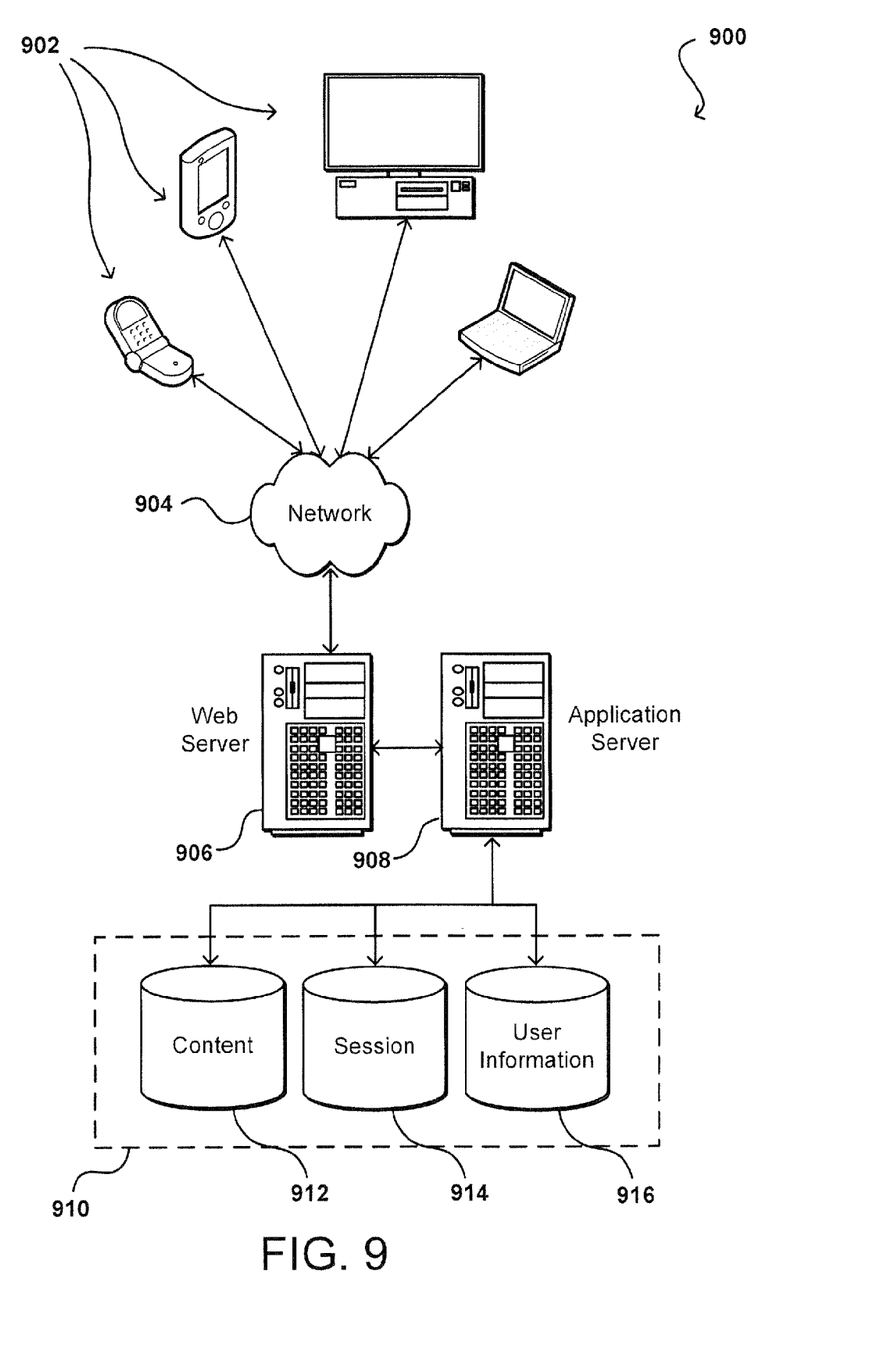
FIG. 9 illustrates an environment in which various embodiments can be implemented.

As discussed, different approaches can be implemented in various environments in accordance with the described embodiments. For example, FIG. 9 illustrates an example of an environment 900 for implementing aspects in accordance with various embodiments. As will be appreciated, although a Web-based environment is used for purposes of explanation, different environments may be used, as appropriate, to implement various embodiments. The system includes an electronic client device 902, which can include any appropriate device operable to send and receive requests, messages or information over an appropriate network 904 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 906 for receiving requests and serving content in response thereto, although for other networks an alternative device serving a similar purpose could be used, as would be apparent to one of ordinary skill in the art.

The illustrative environment includes at least one application server 908 and a data store 910. It should be understood that there can be several application servers, layers or other elements, processes or components, which may be chained or otherwise configured, which can interact to perform tasks such as obtaining data from an appropriate data store. As used herein the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server in the form of HTML, XML or another appropriate structured language in this example. The handling of all requests and responses, as well as the delivery of content between the client device 902 and the application server 908, can be handled by the Web server 906. It should be understood that the Web and application servers are not required and are merely example components, as structured code discussed herein can be executed on any appropriate device or host machine as discussed elsewhere herein.

The data store 910 can include several separate data tables, databases or other data storage mechanisms and media for storing data relating to a particular aspect. For example, the data store illustrated includes mechanisms for storing production data 912 and user information 916, which can be used to serve content for the production side. The data store also is shown to include a mechanism for storing log or session data 914. It should be understood that there can be many other aspects that may need to be stored in the data store, such as page image information and access rights information, which can be stored in any of the above listed mechanisms as appropriate or in additional mechanisms in the data store 910. The data store 910 is operable, through logic associated therewith, to receive instructions from the application server 908 and obtain, update or otherwise process data in response thereto. In one example, a user might submit a search request for a certain type of element. In this case, the data store might access the user information to verify the identity of the user and can access the catalog detail information to obtain information about elements of that type. The information can then be returned to the user, such as in a results listing on a Web page that the user is able to view via a browser on the user device 902. Information for a particular element of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 9. Thus, the depiction of the system 900 in FIG. 9 should be taken as being illustrative in nature and not limiting to the scope of the disclosure.

As discussed above, the various embodiments can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Various aspects also can be implemented as part of at least one service or Web service, such as may be part of a service-oriented architecture. Services such as Web services can communicate using any appropriate type of messaging, such as by using messages in extensible markup language (XML) format and exchanged using an appropriate protocol such as SOAP (derived from the "Simple Object Access Protocol"). Processes provided or executed by such services can be written in any appropriate language, such as the Web Services Description Language (WSDL). Using a language such as WSDL allows for functionality such as the automated generation of client-side code in various SOAP frameworks.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method, performed by at least one processor, for image enhancement at a network service, comprising:

receiving an image and geolocation information indicating where the image was acquired;

identifying, from a library including a plurality of library image portions, a subset of the plurality of library image portions that are associated with the geolocation information;

for at least one source image portion in a plurality of source image portions of the image:

determining at least one library image portion, from the subset, that substantially matches the at least one source image portion, the at least one library image portion being associated with at least one higher resolution version; and modifying the at least one source image portion using the at least one higher resolution version associated with the at least one library image portion; and generating an enhanced version of the image based, at least in part, on the at least one source image portion being modified using the at least one higher resolution version.

2. The computer-implemented method of claim 1, further comprising:

receiving information indicating a subject matter associated with the image, wherein the subset of the plurality of library image portions is identified based, at least in part, on the subject matter.

3. The computer-implemented method of claim 1, wherein the modifying of the at least one source image portion using the higher resolution version further comprises at least one of replacing the at least one source image portion with the higher resolution version or merging the at least one source image portion with the higher resolution version.

4. The computer-implemented method of claim 1, wherein at least some of the plurality of source image portions are included in the library and are utilized as library image portions, and wherein the library is hosted on one or more networked servers configured to communicate with the network service.

5. The computer-implemented method of claim 1, wherein the determining that the at least one library image portion substantially matches the at least one source image portion further comprises comparing a set of pixels of the at least one library image portion to a set of pixels of the at least one source image portion, wherein the comparing utilizes at least one of line detection, edge detection, feature detection, image color comparison, image texture comparison, image shape comparison, or image distance measurement.

6. A computer-implemented method, performed by at least one processor, comprising:

receiving an image and information related to the image;

selecting, from a plurality of library image portions stored at a networked image portion library, a subset of library image portions that are associated with the information;

determining, from the subset, at least one library image portion that corresponds to at least one source image portion of the image;

identifying a higher resolution version of each of the at least one library image portion; and modifying the at least one source image portion of the image using the higher resolution version to cause the at least one source image portion to have a higher resolution than before the modifying.

7. The computer-implemented method of claim 6, further comprising:

generating a down-sampled version for the at least one source image portion;

transmitting the down-sampled version for the at least one source image portion to the networked image portion library; and transmitting the at least one source image portion to the networked image portion library, wherein the subset of library image portions further includes the down-sampled version and the at least one source image portion, and wherein the at least one source image portion corresponds to a higher resolution version of the down-sampled version.

8. The computer-implemented method of claim 6, wherein the information related to the image indicates at least one of a geolocation of a computing device at a time when the image was acquired using a camera of the computing device, a direction at which the camera was facing at the time when the image was acquired, a temporal aspect of when the image was acquired, a subject matter associated with the image, or a description associated with the image.

9. The computer-implemented method of claim 6, further comprising:

identifying a face in the image, wherein the subset of library image portions is selected based, at least in part, on the face identified in the image.

10. The computer-implemented method of claim 9, further comprising:

receiving, from a source configured to communicate with the network service, one or more library image portions associated with the face; and modifying a resolution of at least a portion of the face in the image using, at least in part, the one or more library image portions associated with the face.

11. The computer-implemented method of claim 10, wherein the source configured to communicate with the network service is external to the network service, the source comprising at least one of a social networking service, a networked image storage service, a computing device used to acquire the image, or a computing device associated with a user whose face is identified in the image.

12. The computer-implemented method of claim 6, further comprising:

determining that none of the library image portions from the subset corresponds to the at least one image source portion within an allowable threshold; and performing at least one of lowering the allowable threshold or increasing the subset to include additional library image portions.

13. The computer-implemented method of claim 6, wherein the modifying of the at least one source image portion further comprises at least one of replacing the at least one source image portion with the higher resolution version or merging the at least one source image portion with the higher resolution version.

14. A system comprising:

a processor; and a memory device including instructions that, when executed by the processor, cause the system to:

receive an image and information related to the image;

select, from a plurality of library image portions stored at a networked image portion library, a subset of library image portions that are associated with the information;

determine, from the subset, at least one library image portion that corresponds to at least one source image portion of the image;

identify a higher resolution version of each of the at least one library image portion; and modify the at least one source image portion of the image using the higher resolution version to cause the at least one source image portion to have a higher resolution than before the modifying.

15. The system of claim 14, further comprising:

a computing device including at least one of a geolocation sensor configured to determine geolocation information indicating where the image was acquired, a camera, an orientation sensor configured to determine a direction at which the camera was pointing when the image was acquired by the camera, or a system clock configured to determine a temporal aspect indicating when the image was acquired, and wherein the information related to the image includes at least one of the geolocation information, the direction at which the camera was pointing, or the temporal aspect.

16. The system of claim 14, further comprising:
a computing device including a user interface configured to receive data inputted by a user of the computing device, wherein the information related to the image includes the data inputted by the user, and wherein the data indicates at least one of a subject matter associated with the image or a description associated with the image.

17. The system of claim 14, wherein the modifying of the at least one source image portion further comprises at least one of replacing the at least one source image portion with the higher resolution version or merging the at least one source image portion with the higher resolution version.

18. A non-transitory computer-readable storage medium including instructions, the instructions when executed by a processor of a computing system causing the computing system to:
receive an image and information related to the image;
select, from a plurality of library image portions stored at a networked image portion library, a subset of library image portions that are associated with the information;
determine, from the subset, at least one library image portion that corresponds to at least one source image portion of the image;
identify a higher resolution version of each of the at least one library image portion; and
modify the at least one source image portion of the image using the higher resolution version to cause the at least one source image portion to have a higher resolution than before the modifying.

19. The non-transitory computer-readable storage medium of claim 18, wherein the instructions cause the computing system to further:
generate a down-sampled version for the at least one source image portion;
transmit the down-sampled version for the at least one source image portion to the networked image portion library; and
transmit the at least one source image portion to the networked image portion library, wherein the subset of library image portions further includes the down-sampled version and the at least one source image portion, and wherein the at least one source image portion corresponds to a higher resolution version of the down-sampled version.

20. The non-transitory computer-readable storage medium of claim 18, wherein the information related to the image indicates at least one of a geolocation of a computing device at a time when the image was acquired using a camera of the computing device, a direction at which the camera was facing at the time when the image was acquired, a temporal aspect of when the image was acquired, a subject matter associated with the image, or a description associated with the image.

21. The non-transitory computer-readable storage medium of claim 18, wherein the instructions cause the computing system to further identify a face in the image, and wherein the subset of library image portions is selected based, at least in part, on the face identified in the image.

22. The non-transitory computer-readable storage medium of claim 21, wherein the instructions cause the computing system to further:
receive one or more library image portions associated with the face; and
modify a resolution of at least a portion of the face in the image using, at least in part, the one or more library image portions associated with the face.

23. The non-transitory computer-readable storage medium of claim 22, wherein the instructions cause the computing system to further:
determine that none of the library image portions from the subset corresponds to the at least one source image portion within an allowable threshold; and
perform at least one of lowering the allowable threshold or increasing the subset to include additional library image portions.

24. The non-transitory computer-readable storage medium of claim 18, wherein the modifying of the at least one source image portion further comprises at least one of replacing the at least one source image portion with the higher resolution version or merging the at least one source image portion with the higher resolution version.

* * * * *